United States Patent
Kawai

(10) Patent No.: US 7,834,907 B2
(45) Date of Patent: Nov. 16, 2010

(54) IMAGE-TAKING APPARATUS AND IMAGE PROCESSING METHOD

(75) Inventor: Takashi Kawai, Kanagawa-ken (JP)

(73) Assignee: Canon Kabushiki Kaisha (JP)

( * ) Notice: Subject to any disclaimer, the term of this patent is extended or adjusted under 35 U.S.C. 154(b) by 1097 days.

(21) Appl. No.: 11/071,815

(22) Filed: Mar. 2, 2005

(65) Prior Publication Data

US 2005/0195295 A1 Sep. 8, 2005

(30) Foreign Application Priority Data

Mar. 3, 2004 (JP) ............................ 2004-059846

(51) Int. Cl.
*H04N 5/228* (2006.01)
*H04N 5/225* (2006.01)

(52) U.S. Cl. .................................. 348/208.4; 348/335

(58) Field of Classification Search ............. 348/208.4, 348/208.6, 335, 240.2
See application file for complete search history.

(56) References Cited

U.S. PATENT DOCUMENTS

| | | | |
|---|---|---|---|
| 5,185,667 A * | 2/1993 | Zimmermann | 348/335 |
| 5,313,306 A | 5/1994 | Kuban et al. | |
| 5,345,264 A | 9/1994 | Murata et al. | |
| 5,359,363 A | 10/1994 | Kuban et al. | |
| 5,384,588 A * | 1/1995 | Martin et al. | 348/14.1 |
| 5,428,391 A | 6/1995 | Murata et al. | |
| 5,444,482 A | 8/1995 | Misawa et al. | |
| 5,502,484 A * | 3/1996 | Okada | 348/208.6 |
| 5,764,276 A | 6/1998 | Martin et al. | |
| 5,877,801 A | 3/1999 | Martin et al. | |
| RE36,207 E | 5/1999 | Zimmermann et al. | |
| 5,903,319 A | 5/1999 | Busko et al. | |
| 5,926,212 A * | 7/1999 | Kondo | 348/208.4 |
| 5,990,941 A * | 11/1999 | Jackson et al. | 348/335 |
| 6,002,430 A | 12/1999 | McCall et al. | |
| 6,201,574 B1 | 3/2001 | Martin | |
| 6,243,131 B1 | 6/2001 | Martin | |
| 6,256,061 B1 | 7/2001 | Martin et al. | |
| 6,301,447 B1 | 10/2001 | Jackson et al. | |
| 6,603,502 B2 | 8/2003 | Martin et al. | |
| 6,873,358 B1 * | 3/2005 | Shimizu | 348/240.99 |
| 7,057,645 B1 * | 6/2006 | Hara et al. | 348/208.6 |
| 7,511,756 B2 * | 3/2009 | Kawai | 348/208.99 |
| 2002/0003896 A1 | 1/2002 | Yamazaki | |
| 2002/0097332 A1 | 7/2002 | Martin et al. | |
| 2002/0163581 A1 | 11/2002 | Kitazawa et al. | |

FOREIGN PATENT DOCUMENTS

JP          6-46317 A          2/1994

(Continued)

*Primary Examiner*—Nhan T Tran
(74) *Attorney, Agent, or Firm*—Rossi, Kimms & McDowell LLP

(57) ABSTRACT

An image taking apparatus capable of taking a first image in accordance with a first projection method includes an image taking element for photoelectrically converting the first image, conversion means for converting an area in the first image acquired with the image taking element to a second image in accordance with a second projection method different from the first projection method, and vibration detection means for acquiring information about vibration of the image taking apparatus. The conversion means of the image taking apparatus is configured to change the size of the conversion area in the first image based on the vibration information.

14 Claims, 9 Drawing Sheets

7021

FOREIGN PATENT DOCUMENTS

| | | |
|---|---|---|
| JP | 6-501585 | 2/1994 |
| JP | 6-315107 A | 11/1994 |
| JP | 08-307753 * | 11/1996 |
| JP | 8-307753 A | 11/1996 |
| JP | 10-233950 A | 9/1998 |
| JP | 2000-106664 A | 4/2000 |
| JP | 2000-152054 A | 5/2000 |
| JP | 2000-184265 A | 6/2000 |
| JP | 2000-284336 A | 10/2000 |
| JP | 2002-165127 A | 6/2002 |
| JP | 2002-326847 A | 11/2002 |
| WO | 98/27718 A1 | 6/1998 |

* cited by examiner

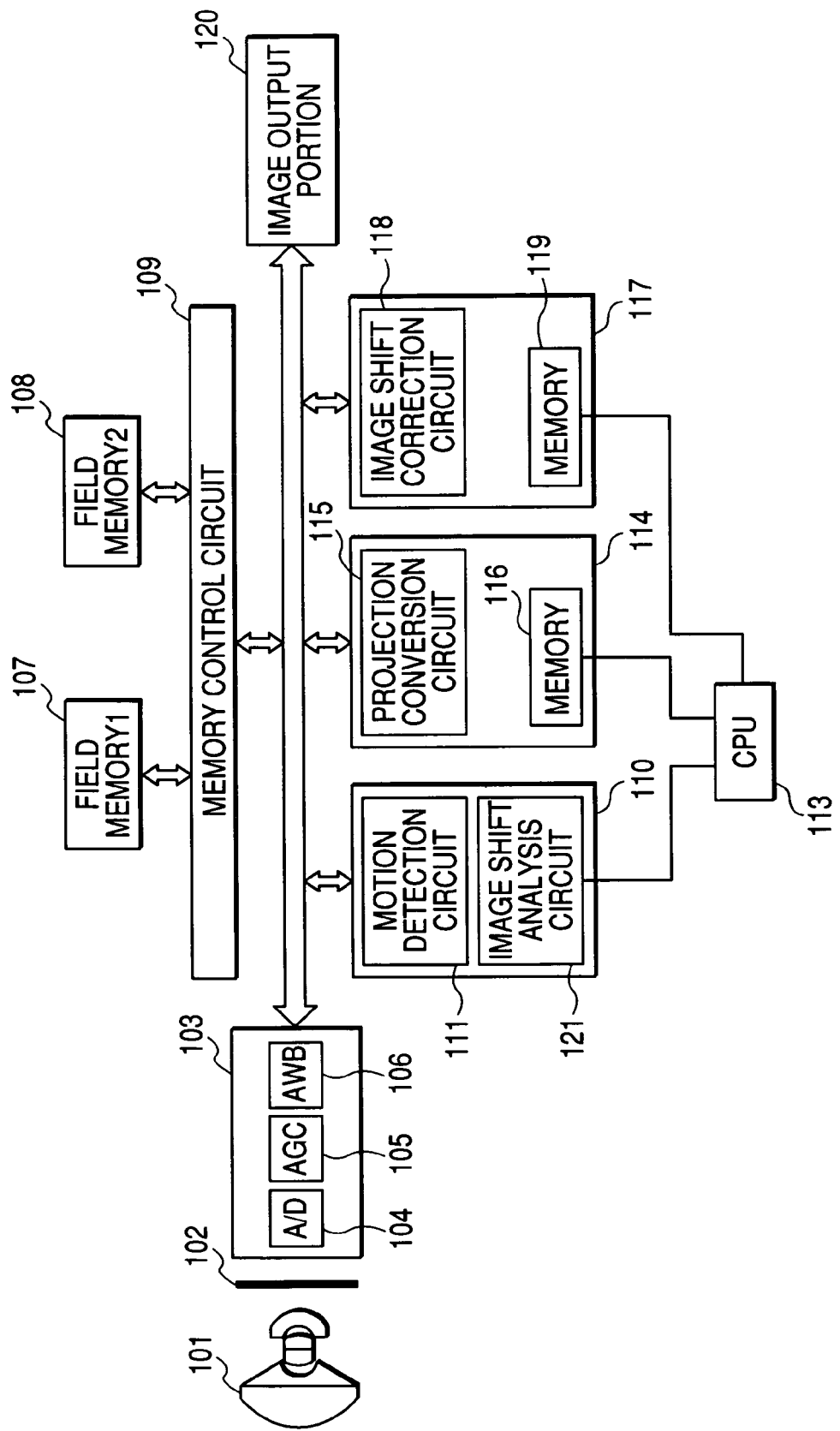

7021

1121

1131

1223  1222  1211

IMAGE-TAKING APPARATUS AND IMAGE PROCESSING METHOD

BACKGROUND OF THE INVENTION

1. Field of the Invention

The present invention relates an image taking apparatus for acquiring image information using an image taking element, and in particular to a program created to output a perspectively projected image obtained by performing a image shift correction process for an acquired fisheye image, or an image taking apparatus mounted with the program and configured to output the perspectively projected image.

2. Related Background Art

Wide-viewing-angle image taking by a fisheye optical system is employed in various fields such as monitoring, remote operation, TV conference and endoscope. The wide-viewing-angle image taking is characterized in capable of projecting a super-wide-viewing-angle image with an field angle of more than 180° onto a limited area of the light receiving surface of an image taking element due to its special projection method and capable of acquiring even such a super-wide-viewing-angle image that theoretically could not be acquired by a common image taking apparatus for taking a perspectively projected image. However, in the projection method specific to fisheye optical system, the form of a taken image is distorted and is significantly different from the form of an original object.

As an approach for solving this problem, there is proposed an apparatus for converting an acquired fisheye image to a perspectively projected image and displaying the converted image on a display in U.S. Pat. No. 5,185,667, U.S. Pat. No. 5,313,306, U.S. Pat. No. 5,359,363, U.S. Pat. No. 5,384,588, U.S. Pat. No. 5,764,276, U.S. Pat. No. 5,877,801, U.S. Pat. No. 5,903,319, U.S. Pat. No. 5,990,941, U.S. Pat. No. 6,002,430, US AA2002097332, U.S. Pat. No. 6,201,574, U.S. Pat. No. 6,243,131, U.S. Pat. No. 6,256,061, U.S. Pat. No. 6,301,447, U.S. Pat. No. 6,603,502 and U.S. RE36207 (hereinafter collectively referred to as "U.S. Pat. No. 5,185,667 and the like"). In U.S. Pat. No. 5,185,667 and the like, the pan, tilt, rotation and magnification are specified for any image area in an image in a hemispherical field of view which has been acquired by fisheye image taking, and coordinate transformation is performed for the image area with the use of X-map and Y-map of two-dimensional mapping to enable omnidirectional observation of the image.

In WO98/27718A1 (specifically in FIGS. 1 to 3), there is proposed electronic zoom using image information density distribution of an image taken by a fisheye optical system. Specifically, an image taken by a fisheye optical system has a characteristic that the compression rate is higher in its peripheral part and the magnification ratio is higher in the central part, and by utilizing this characteristic, electronic zoom can be performed without reducing the resolution.

Furthermore, in Japanese Patent Application Laid-Open No. 8-307753 (specifically in FIG. 10), there is proposed an apparatus capable of following the motion of an observer's head and thereby displaying data of a part of a wide-viewing-angle image taken with a fisheye lens without causing distortion. Especially in the third embodiment described in this patent document, a conversion process is performed for displaying an image taken with a fisheye lens employing an equidistant projection method, as a plane without distortion, and then, an image shift correction process for correcting image shift caused by shaking of an image taking apparatus is further performed for the image. The correction process is performed when the amount of pixel displacement corresponding to image shift is equal to or below a predetermined number of pixels (for example, two pixels).

In the apparatus proposed in U.S. Pat. No. 5,185,667 and the like, however, execution to a pan, tilt, rotation or zoom function is set for any area by specifying a viewing angle and a magnification from input means, solving a conversion equation by means of a microcomputer and setting a conversion table for a two-dimensional map. Therefore, there is a problem that, since it is required to solve the conversion equation even for slight change in the viewing angle or the magnification every time such change occurs, a lot of calculation burden is imposed on the microcomputer.

In the apparatus proposed in WO 98/27718A1, by using image information density distribution of a fisheye image, it is possible to acquire an electronically zoom image the resolution of which has not been deteriorated much. However, there is a problem that as the zoom ratio is higher, distortion of the image is caused by vibration given to the apparatus body, such as shaking and resolution deterioration is caused.

In the apparatus proposed in Japanese Patent Application Laid-Open No. 8-307753, the criteria for performing an image shift correction process is as follows. That is, the correction process is controlled to be performed if the detected amount of pixel displacement (the amount of displacement between pixels (positions) on which two images are displayed respectively when the images should be displayed on the same pixel (position) but displayed on the different pixels (positions)) is larger than a predetermined number of pixels when they are compared. However, the value of the amount of pixel displacement due to image picture shift or positional change is significantly influenced by the amount of vibration given to the apparatus body, the zoom ratio and the like. Therefore, the value is determined depending on each of all zoom ratios, and if determination whether or not to perform the correction process is controlled based on a single threshold (the number of pixels), the tolerance value for image shift is different for each zoom ratio. This not preferable.

SUMMARY OF THE INVENTION

One aspect of the present invention is an image taking apparatus capable of taking a fist image in accordance with a first projection method, the image taking apparatus comprises:

an image taking element for photoelectrically converting the first image;

conversion means for converting an image in a conversion area in the first image acquired with the image taking element to a second image which is in accordance with a second projection method different from the first projection method; and vibration detection means for acquiring information about vibration of the image taking apparatus that the conversion means changes the size of the conversion area based on the vibration information.

It is preferable that the image taking apparatus further comprises;

image shift correction means for shifting an area in the second image, which is to be outputted, based on the vibration information.

Furthermore, it is preferable in the above image taking apparatus that the first image is a fisheye image and the second image is a perspectively projected image.

Furthermore, it is preferable in the above image taking apparatus that the conversion means enlarges the conversion area as the vibration is larger.

Furthermore, it is preferable that the above image taking apparatus further comprises:

zoom means for changing the zoom ratio of the first image, and that the conversion means changes the size of the conversion area based on the vibration information and information about the zoom ratio.

Furthermore, it is preferable in the above image taking apparatus that the conversion means reduces the conversion area as the zoom ratio is larger.

In addition, further aspect of the present invention is an image processing method comprising:

a conversion step of converting an image in a conversion area in a first image which is in accordance with a first projection method to a second image which is in accordance with a second projection method different from the first projection method; and an image shift detection step of acquiring information about image shift in the first image;

wherein the conversion step changes the size of the conversion area based on the information about image shift.

It is preferable that the image taking method further comprises:

a image shift correction step of shifting an area in the second image, which is to be outputted, based on the information about image shift.

Furthermore, it is preferable in the above image taking method that the first image is a fisheye image and the second image is a perspectively projected image.

Furthermore, it is preferable in the above image taking method that the conversion step enlarges the conversion area as the image shift is larger.

Furthermore, it is preferable that above image taking method further comprises:

a zoom setting step of changing the zoom ratio of the first image, and that the conversion step changes the size of the conversion area based on the information about image shift and information about the zoom ratio.

Furthermore, it is preferable in the above the image taking method that the conversion step reduces the conversion area as the zoom ratio is larger.

Furthermore, another aspect of the present invention is an image processing program for causing a computer to perform the above described image processing method.

In addition, further aspect of the present invention is an image taking apparatus capable of taking a fist image in accordance with a first projection method, the image taking apparatus comprises:

an image taking element for photoelectrically converting the first image;

conversion means for converting an image in a conversion area in the first image acquired with the image taking element to a second image which is in accordance with a second projection method different from the first projection method; and vibration detection means for acquiring information about vibration of the image taking apparatus that the conversion means performs a reduction process for the second image at a reduction ratio corresponding to the vibration information.

It is preferable that image taking apparatus further comprises:

image shift correction means for shifting an area in the second image, which is to be outputted, based on the vibration information.

Furthermore, it is preferable in the above image taking apparatus that the first image is a fisheye image and the second image is a perspectively projected image.

In addition, further aspect of the present invention is an image processing method comprising:

a conversion step of converting an image in a conversion area in a first image which is in accordance with a first projection method to a second image which is in accordance with a second projection method different from the first projection method; and an image shift detection step of acquiring information about image shift in the first image that the conversion step performs a reduction process for the second image at a reduction ratio corresponding to the vibration information.

It is preferable that above image taking method further comprises:

a image shift correction step of shifting an area in the second image, which is to be outputted, based on the information about image shift.

Furthermore, it is preferable in the above image taking method that the first image is a fisheye image and the second image is a perspectively projected image.

Furthermore, another aspect of the present invention is an image processing program for causing a computer to perform the above described image processing method.

BRIEF DESCRIPTION OF THE DRAWINGS

FIG. 1 is a block diagram showing an image taking apparatus which is an embodiment 1 the present invention;

DESCRIPTION OF THE PREFERRED EMBODIMENTS

Figure 2A:
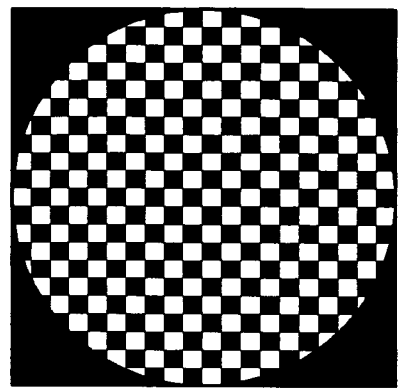
FIG. 2A shows an object in a grid pattern.

The object of the embodiments is to make it possible to correct image shift while reducing image quality deterioration, in an image taking apparatus which converts a fisheye image to a perspectively projected image (perspective image).

Note that the perspectively projected image (perspective image) is an image or an image like the image which is obtained by taking image used so-called f-tan θ optical system. That is, that image is different from an image obtained by using the fisheye lens (or fisheye optical system), but is an image in which there is not much difference in the image distortions in the central portion of the image and in the periphery portion of the image.

Furthermore, an "image shift" in the invention means a movement of an image of the object to be taken, i.e., a position change of the object image on the image pick-up element caused by the hand vibration or the like, and is particularly, a movement of the object image in taking a moving image.

Hence, as described in detail below, the object of the embodiments is to prevent a case in which when taking the moving image by using the fisheye optical system or the like, the object image (predetermined image) has a defect caused by the hand vibration or the like. To achieve the object, in the present embodiments, when an image obtained by a image taking apparatus using with a fisheye optical system (an image obtained by a first projection manner) is converted into a perspectively projected image (an image obtained by a second projection manner), a size of an area to be converted is changed in accordance with a shift amount of the position of the object image (or, an amount which can be replaced with the shift amount, such as a vibration amount of the image taking apparatus). Specifically, as larger the positional shift of the object image, the size of the area to be converted is made larger.

Embodiments of the present invention will be now described with reference to the drawings.

Embodiment 1

FIG. 1 shows the configuration of an image taking apparatus which is an embodiment 1. In FIG. 1, reference numeral 101 denotes a fisheye optical system for forming a fisheye image of an object, and reference numeral 102 denotes an image taking element (a photoelectric conversion element) consisting of a CCD sensor or a CMOS sensor. Here, the fisheye image means an image acquired through a so-called fisheye lens. As the projection method to be employed by the fisheye optical system, there are a stereographic projection method (y=2f tan(θ/2)), an equidistant projection method (y=fθ), an equisolidangle projection method (y=2f sin(θ/2)), an orthographic projection method (y=f sin θ) and the like, and the manner in which an object is projected is naturally different according to the projection method. In this specification, when there is an expression "an image taken by the stereographic projection method", for example, it indicates either an image taken with the use of a fisheye optical system employing the stereographic projection method or an image which has not been actually taken with the use of a fisheye optical system employing the stereographic projection method but appears to be as if it had been taken with the use of a fisheye optical system employing the stereographic projection method. The fisheye optical system described above is configured to project (form an image of) an object while generation barrel-shaped distortion aberration, irrespective of the projection method. The fisheye optical system is an optical system with a field angle of more than 120 degrees, more preferably more than 140 degrees, and much more preferably 160 degrees, which is characterized in that the field angle thereof is significantly large in comparison with an exchange lens to be attached to a common image taking apparatus (a camera). Unlike the projection methods for a fisheye optical system, the projection method employed by common image taking apparatus is called a perspective projection method (an image taken by the image taking apparatus is called a perspectively projected image). The perspective projection method is a method for projecting an image similar to an object seen from a camera position in principle.

A perspectively projected image and a fisheye image are defined as follows: the perspectively projected image is an image similar to an image seen from a point (a position where a camera is located), and the fisheye image is an image obtained by reducing an image seen from a point with the reduction ratio for the central part of the image lower than the reduction ratio for the edge part of the image (that is, the central part of the image appears relatively larger) (or by magnifying the image with the magnification ratio for the central part of the image higher than the magnification ratio for the edge part of the image). In this case, in the fisheye image, the reduction ratio (or the magnification ratio) is continuously changed from the central part of the image to the edge part of the image. The manner of change is different in the central part and the edge part (in other words, the ratio of the compression rate for the central part of the image and the compression rate for the edge part of the image changes) in the stereographic projection method, the equidistant projection method, the equisolidangle projection method and the orthographic projection method described above, while the reduction ratio (or the magnification ratio) substantially does not change (it may slightly change due to influence of aberration but substantially does not change) in the projection method.

Reference numeral 103 denotes an image generation circuit for image-processing an electric signal outputted front the image taking element 102 and generating an image signal.

The image generation circuit 103 comprises an A/D conversion circuit 104 for converting an analog signal to a digital signal, an automatic gain control circuit (AGC) 105 for performing level correction of the digital signal, an automatic white balance circuit (AWB) 106 for performing white level correction of a picture and an image processing circuit not shown, and generates digital fisheye picture data as the picture signal through the processes performed at these circuits.

Reference numerals 107 and 108 denote first and second filed memories (field memories 1 and 2) for temporarily storing and retaining picture signals corresponding to one or more screens. The first field memory 107 stores and retains a picture signal generated by the image generation circuit 103. The second field memory 108 stores and retains a picture signal for which a distortion correction process (a projection conversion process) for fisheye pictures, which will be described later, has been performed.

Reference numeral 109 denotes a memory control circuit for controlling picture signals inputted to and outputted from the first and second field memories 107 and 108, and reference numeral 110 denotes a shaking detection section constituted by a motion detection circuit 111 for detecting motion (vibration) of the image taking apparatus, from picture signals of video fields adjacent to each other, and a shaking analysis circuit 121 for analyzing the tendency of the motion. This shaking detection section is not necessarily required to detect motion of the image taking apparatus from picture signals. Any mechanism may be substituted which has functions of detecting or measuring motion (vibration) of the image taking apparatus, for example, an accelerometer and a circuit for calculating the motion (vibration) of the image taking apparatus from the detection result of the accelerometer.

The result of analysis by the shaking analysis circuit 121 is communicated to second and third memories 116 and 119 provided for a picture conversion section 114 and a image shift correction processing section 117 to be described later, respectively.

The conversion processing section 114 comprises the second memory 116 and a projection conversion circuit 115 for performing projection conversion (conversion of an image of an object taken in a projection method substantially to an image of the object taken in a different projection method; in other words, conversion of an image taken in a projection method to an image which appears as if it had been taken in a different projection method) from fisheye image data, which is a picture signal stored in the second memory 116, to perspectively projected image data to be described later.

The image shift correction processing section 117 comprises the third memory 119 in which the result of the motion analysis is stored as the amount of shift of a picture read-out area on the perspectively projected image, and a image shift correction circuit 118 for, by shifting the picture read-out area and reading and outputting image data in the area, performing electric image shift correction of the image as well as performing an interpolation process to be described later.

A picture output section 120 sequentially outputs and displays perspectively projected image data for which image shift correction has been performed to a display device not shown, or outputs the data to a recording medium (such as a semiconductor memory, a magnetic disk and an optical disk) so that it is recorded thereto. Reference numeral 113 denotes a CPU as a controller responsible for control of the image taking apparatus, data communication and the like.

Description will be now made on the operation of the image taking apparatus configured as described above. An image of an object (a fisheye image) projected by the fisheye optical system 101 is formed on the image taking element 102. The fisheye optical system 101 is capable of forming an image of a light beam with an incidence angle relative to the optical axis from 0 to nearly 90 degrees, on the image taking element 102. The projected image is accompanied by distortion caused, for example, by an equidistant projection method in which the distance (h) from the optical axis is proportional to the incidence angle (θ) (h=f·θ; where f denotes focal length) or an orthographic projection method in which the distance is proportional to a sine function (h=f·sin θ)).

The formed object image is photoelectrically converted by the image taking element 102, and an analog picture signal corresponding to the brightness of the object is outputted from the image taking element 102 and inputted to the image generation circuit 103. In the image generation circuit 103, the analog picture signal is converted, for example, to a fourteen-bit digital signal by the A/D conversion circuit 104. Furthermore, fisheye image data, which are picture signals for which signal level correction and white level correction have been performed by the automatic gain control circuit (AGC) 105 and the automatic white balance circuit (AWB) 106, are sequentially and temporarily stored and retained in the first field memory 107.

Figure 2B:
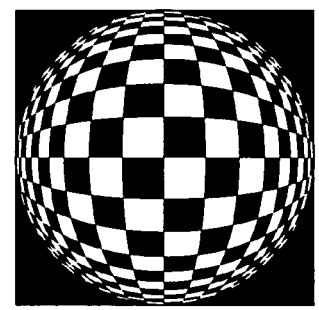
FIG. 2B shows a fisheye image projected on an image taking element by a fisheye optical system.

FIGS. 2A and 2B schematically show an original object and a projected image provided by the fisheye optical system 101, respectively. FIG. 2A shows an object in a grid pattern, and FIG. 2B shows a fisheye image obtained by the fisheye optical system 101 projecting the object onto the image taking element 102 by orthographic projection. The above-described image processing is performed for the photoelectrically converted data (fisheye image data) of the fisheye image 202, and the data is stored in the first field memory 107.

The image taking apparatus sequentially takes filed images at a predetermined frame rate, and fisheye image data corresponding to one field, which is stored and retained in the first field memory 107, is inputted to the motion detection circuit 111 together with fisheye image data of the subsequent field. At the same time, fisheye image data of an old filed in the first field memory 107 is rewritten and updated with fisheye image data of the current field. The operation described above is controlled by the memory control circuit 109.

In the motion detection circuit 111, for multiple areas in each of fisheye image data of the continuous two fields, the motion vector of each area is determined by a template matching method, which is an approach for detecting a corresponding area. Determination of the motion vector, however, is not limited to the template matching method, and other approaches such as a gradient method are also applicable. It is preferable to provide multiple points at which motion vectors are to be extracted, on a circle surrounding the approximate center of the fisheye image (a circle (an almost circular shape is acceptable) is preferable though a square, a rectangle or an ellipse are applicable) and to arrange two or three such circles to surround the approximate center of the fisheye image. Furthermore, it is preferable to attach multiple kinds of weight to the extraction points, and it is desirable that more weight is attached to an extraction point nearer to the approximate center of the fisheye image it possible.

The shaking analysis circuit 112 integrates the motion vectors of the multiple areas detected by the motion detection circuit 111 to generate a motion vector corresponding to the vibration of the image taking apparatus, and then converts it to vibration information including magnitude of vibration (amplitude) and a vibration cycle (frequency), which are characteristics of the motion of the image taking apparatus. The amount of shaking within a predetermined time is analyzed with the use of these characteristics.

Figure 3A:
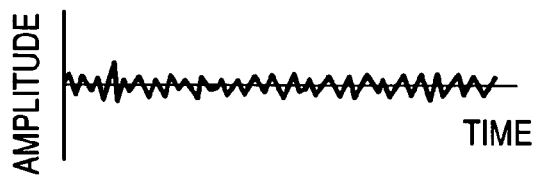
FIGS. 3A and 3B show vibration caused when a photographer is in a motionless condition.
Figure 3B:
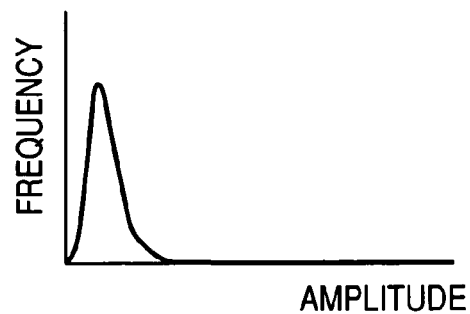

FIGS. 3A and 3B and FIGS. 4A and 4B show characteristics of typical vibration types. FIG. 3A shows an example of shaking caused when a photographer takes a picture of a particular object in a motionless condition (without walking). Specifically, the figure shows a graph in which the horizontal axis indicates time and the vertical axis indicates the amount of amplitude to show time-series variation in vibration due to shaking. In this case, a slight vibration is characteristically repeated at a relatively high frequency. FIG. 3B shows a histogram with the amount of amplitude indicated by the horizontal axis and with the vibration occurrence frequency indicated by the vertical axis. As seen from this histogram, shaking caused when a photographer is in a motionless condition is characterized in having a single frequency peak at a small amplitude value.

Figure 4A:
FIGS. 4A and 4B show vibration caused when a photographer is walking.
Figure 4B:
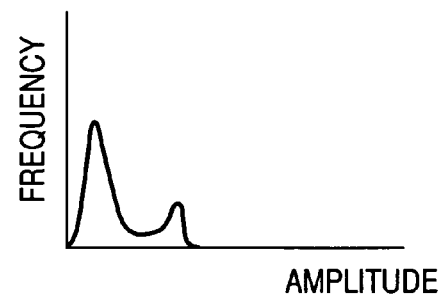

On the other hand, FIGS. 4A and 4B show an example of vibration cause when a photographer takes a picture while walking with the image taking apparatus. In this case, in addition to the vibration with a high frequency and a slight amplitude caused in a motionless condition, vibration specific to walking is added. FIG. 4A shows time-series variation in vibration caused in this case. In addition to the vibration with a slight amplitude and a high frequency caused in a motionless condition, a large amplitude caused when a foot leaves from and contacts with the ground in walking is added. The cycle this large amplitude occurs corresponds to a time interval of a walking step and therefore depends on a walking speed.

When a histogram with an amplitude indicated by the horizontal axis and with a frequency indicated by the vertical axis as shown in FIG. 4B is created based on the vibration, it is seen from the histogram that the vibration caused when a picture is taken during walking is characterized in having a first frequency peak P1 with a small amplitude value due to shaking in a motionless condition and a second frequency peak P2 with a large amplitude value due to vibration caused when a step leaves from and contacts with the ground.

The characteristic of the vibration caused in the image taking apparatus are accumulated for a predetermined period of time and then analyzed by the shaking analysis circuit 112.

Figure 5A:
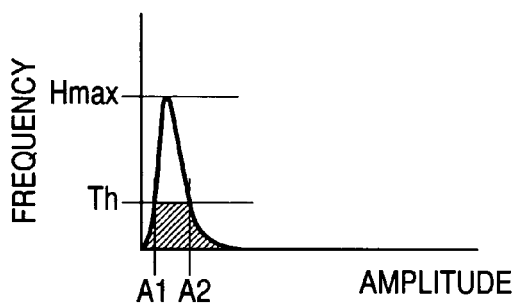
FIGS. 5A and 5B illustrate an example of a shaking analysis method.
Figure 5B:
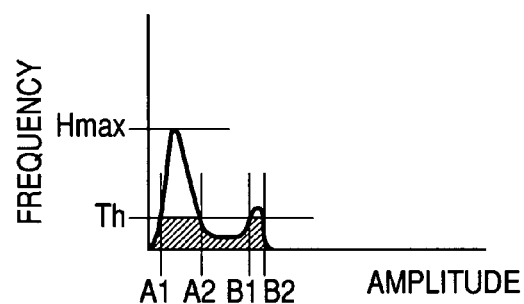

FIGS. 5A and 5B show examples of an analysis method performed at the shaking analysis circuit 112. FIGS. 5A and 5B show examples of the amplitude/frequency analysis performed with the use of the histograms shown in FIG. 3B and FIG. 4B, respectively.

The shaking analysis circuit 112 generates the above amplitude/frequency histogram and detects the maximum frequency value (Hmax in the figure). Then, it sets a frequency threshold Th smaller than Hmax. Th is set to be 1/a (a>1) of the maximum frequency value Hmax, as Th=Hmax/3, for example.

Then, the frequency of each amplitude value is compared to the threshold TH sequentially from the side with an amplitude value of 0 to determine which is larger. The amplitude values with a frequency higher than the threshold Th exist between A1 and A2 in the histogram in FIG. 5A, while such amplitude values exist in two areas between A1 and A2 and between B1 and B2 in the histogram FIG. 5B. In this way, it is possible to make analysis on frequency distribution, such as analysis on whether vibration has a single frequency peak or multiple frequency peaks.

Figure 6A:
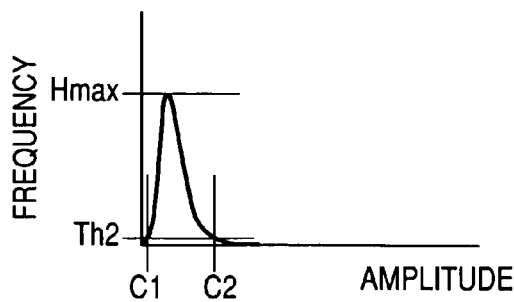
FIGS. 6A and 6B illustrate an example of a shaking analysis method.
Figure 6B:
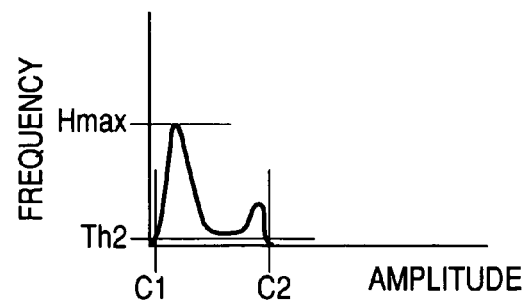

An example of analysis of the amount of amplitude with the use of the same amplitude/frequency histogram will be described below. FIGS. 6A and 6B are amplitude/frequency histograms similar to those in FIGS. 5A, 5B, 3B and FIG. 4B respectively.

The shaking analysis circuit 112 detects the maximum frequency value (Hmax) from the amplitude/frequency histogram. Then, it sets a frequency threshold Th2 smaller than Hmax. Th2 is set to be 1/b (b>a>1) of the maximum frequency value Hmax, such as Th2=Hmax/10, and it is desirable to set b as large as possible.

Then, comparison of the frequency and the threshold Th2 is performed sequentially from the side with an amplitude value of 0 toward a larger amplitude to determine which is larger. Furthermore, comparison of the frequency and the threshold Th2 is also performed sequentially from the side with an amplitude value ∞ of the histogram (actually, the maximum input value of the histogram) toward a smaller amplitude to determine which is larger. Then, an amplitude value when the frequency exceeds the threshold value Th2 for the first time is determined in each the comparisons, and the values are determined as the minimum amplitude value C1 and the maximum amplitude value C2.

In this way, the maximum amplitude value C2 and the minimum amplitude value C1 are detected, and the dispersion of the amplitudes is analyzed from the difference value between them (C2−C1). Alternatively, it is also possible to determine a variance value from the amplitude/frequency histogram to determine accurate dispersion. As described above, the characteristics of vibration given to the image taking apparatus are analyzed by the shaking detection section 110.

The result of the analysis of vibration is stored in the memory 116 of the projection conversion section 114, and at the same time, it is communicated to a projection conversion circuit 115.

The projection conversion circuit 115 will be now described. The projection conversion circuit 115 has a function of inputting a fisheye image stored and retained in the first field memory 107, correcting distortion specific to a fisheye image, and outputting it to the second field memory 108 so that it is stored and retained by the second field memory 108.

Figure 7C:
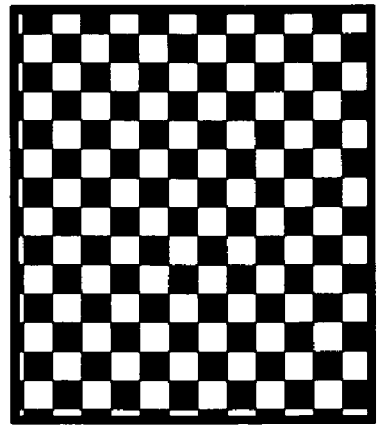
FIGS. 7A, 7B and 7C schematically show a projection conversion process.
Figure 7B:
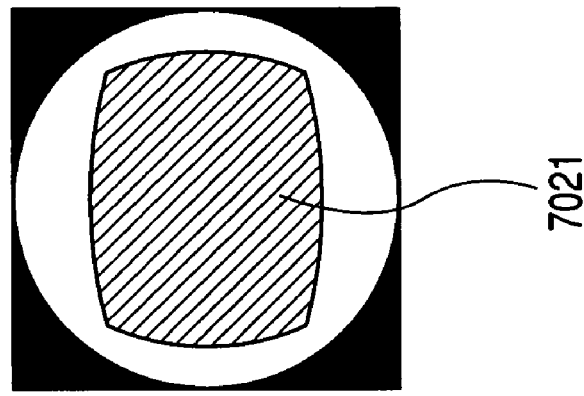
Figure 7A:
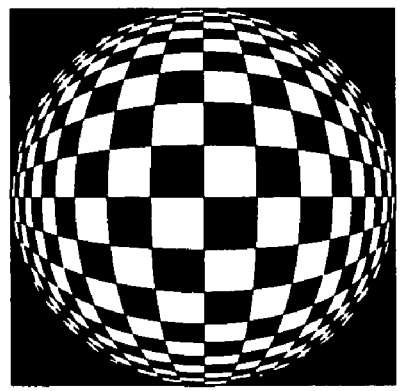

FIGS. 7A, 7B and 7C schematically show the function and the effect of the projection conversion circuit 115. FIG. 7A shows a fisheye image stored and retained in the first field memory 107. This fisheye image corresponds to an image which is formed on the image taking element 102 and which depends on the projection method of the fisheye optical system 101. Fisheye images include images other than a perspectively projected image for which the distance h from the optical axis is indicated by h=f·tan θ, such as an equidistantly projected image for which the distance h from the optical axis is indicated by h=f·θ and an orthographically projected image for which the distance h from the optical axis is indicated by h=f·sin θ, where the incidence angle (an angle relative to the optical axis) of a light beam from an object relative to the fisheye optical system 101 is denoted by θ. In this embodiment, a fisheye image 701 formed by the fisheye optical system 101 will be described as an orthographically projected image.

As shown in FIG. 7B, the projection conversion circuit 115 performs projection conversion of a conversion area 7021, a part of a fisheye image stored and retained in the first field memory 107, to a perspectively projected image indicated by h=f·tan θ and outputs it to the second field memory 108. FIG. 7C shows the memory space of the second field memory 108 and shows that a perspectively projected image obtained after the projection conversion of the conversion area 7021 is developed wholly over the memory space 703. That is, it is shown that the object in a grid pattern shown in FIG. 2A is distorted by orthographic projection as shown in FIG. 7A, and then the distortion is corrected by the automatic gain control circuit 105. The operation described above is the basic operation of the projection conversion circuit.

Next, description will be made on the operation performed when vibration is given to the image taking apparatus body and image shift is caused thereby. When vibration is given to the image taking apparatus body and image shift is caused, the projection conversion circuit 115 performs projection conversion from a fisheye image to a perspectively projected image in order to perform a image shift correction process to be described later. At the same time, the projection conversion circuit 115 also performs a reduction process for the perspectively projected image to provide a margin for the image shift correction process.

Figure 8A:
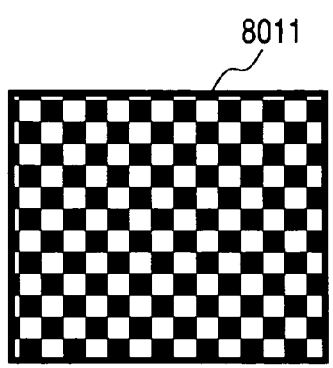
FIG. 8A shows a field memory space when image shift correction is not performed.
Figure 8B:
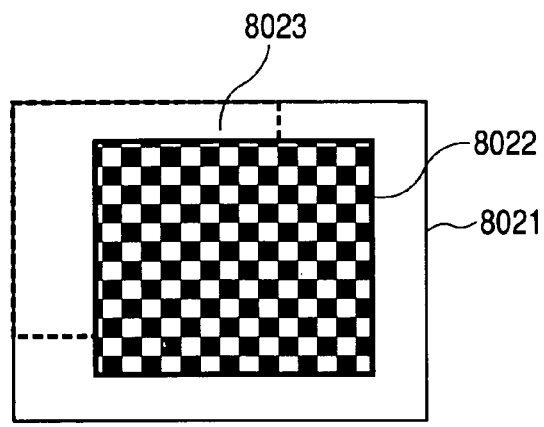
FIG. 8B shows a field memory space when image shift correction is performed.

FIGS. 8A and 8B show the memory space of the second field memory 108. When vibration is not given to the image taking apparatus, that is, when image shift correction is not performed, a projected image is developed over the whole space indicated as a field memory 8011, as shown in FIG. 8A.

On the other hand, when vibration is given to the image taking apparatus and a image shift correction process is performed, the projected image is reduced and developed in a memory space 8021 of the second field memory 108, as denoted by reference numeral 8022 in FIG. 8B. In this case, in the whole memory space 8021, there is developed an image with a wider viewing angle in comparison with the case of FIG. 8A, by the degree corresponding to the reduced area (including the desired projected image). Therefore, when image shift is caused by vibration, for example, the desired image is projected on an area 8023 surrounded by a dashed line. When image shift is caused by vibration as in this case, it is possible to prevent the image from being influenced by shaking of the apparatus by enlarging the read-out area in the memory space by the amount (the amount in the memory space, for example, the number of pixels) corresponding to the shift or positional change (or by the amount more than the amount corresponding to the shift or positional change, of course). It is also possible to correct picture image shift by shifting the read-out area within the memory space as the image taking apparatus shakes.

The read-out area shifting is performed by the image shift correction circuit 118 of the image shift correction processing section 117. An interpolation process is performed by the image shift correction circuit 118 for the reduced image, and the image is enlarged to the original size.

The electronic image shift correction described above is accompanied by a scaling process for image data and, therefore, by some image quality deterioration. In order to minimize the image quality deterioration, it is necessary to suppress the reduction ratio (to try not to reduce the image as far as possible).

Accordingly, in this embodiment, the size of an area for which projection conversion is to be performed (a conversion area) in fisheye image data is changed based on the result of the vibration analysis by the shaking analysis circuit 112, which has been described above. At the same time, the reduction ratio for the perspectively projected image is controlled.

To explain this specifically, if it is determined that a photographer is in a motionless condition and shaking is caused, from the above-described vibration analysis shown in FIG. 5A, then the maximum amplitude value C2 is determined from FIG. 6. Then, a conversion area 1001 with a size shown in FIG. 10B is set in the fisheye image data shown in FIG. 10A. The reduction ratio is set as small as possible within a range enabling correction of picture distortion due to the maximum amplitude value C2. Thereby, when shift or positional change at the maximum amplitude value C2 is corrected, projection conversion is performed at a reduction ratio causing the least image quality deterioration for the area 8023, an area nearest to the edge in the memory space in FIG. 8B, so that the area 8023 is to be a read-out area at the maximum amplitude value C2.

Figure 10C:
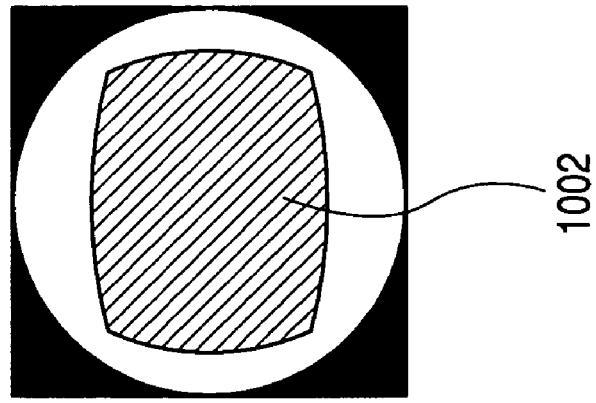
FIGS. 10B and 10C show a projection conversion area determined depending on vibration.
Figure 10B:
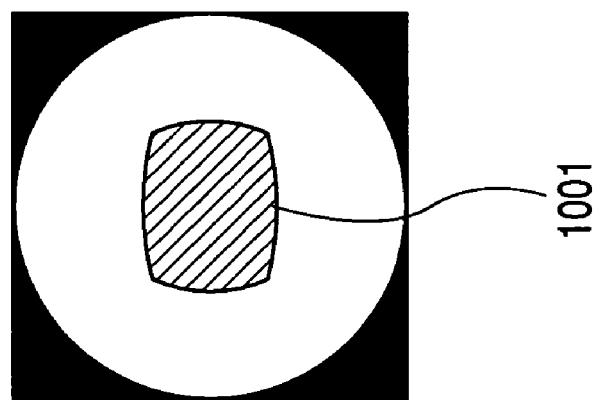
Figure 10A:
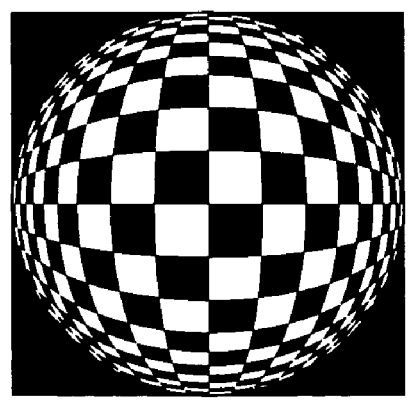
FIG. 10A shows an object in a grid pattern.

If the maximum amplitude value C2 during a photographers walking, which has been determined from FIG. 6B, is large, then a conversion area 1002 larger than the conversion area in FIG. 10B (representing a conversion area on a photoelectrical conversion element, e.g., CCD) is set in the fisheye image shown in FIG. 10A, as shown in FIG. 10C.

Figure 9A:
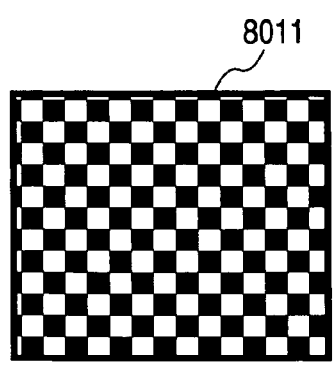
FIG. 9A shows a field memory space when image shift correction is not performed.
Figure 9B:
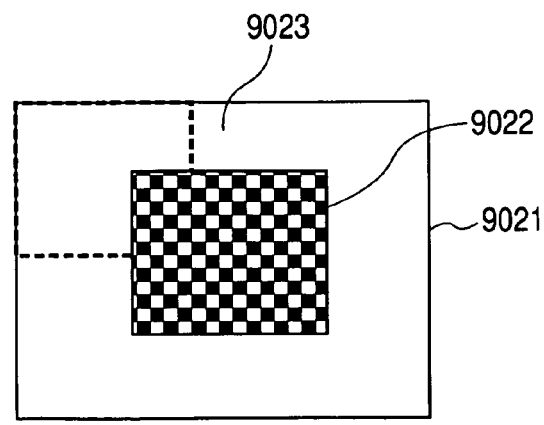
FIG. 9B shows a field memory space when image shift correction is performed.

If the maximum amplitude value is large, an area in a memory space of the field memory, on which a projected image is developed, is set as shown in FIG. 9B. In FIG. 9B, the area on which the projected image is developed is shown as area 9022 becomes smaller than the area 8022 in FIG. 8B on which the projected image is developed in a case that the maximum amplitude value is small. In FIG. 9B, the reference numeral 9021 designates, like the area 8021 shown in FIG. 8B, the whole memory space, and the reference numeral 9023 designates, like the area 8023, a margin area for containing in the memory space the projected image which is moving in the memory space when the vibration is caused. The FIG. 9A shows, like the FIG. 8A, a case in which the maximum amplitude value is zero.

The scaling ratio which changes depending on the shaking may be adjusted from an operation section not shown, with a scaling ratio for the possible maximum amplitude value C2 (for example, the maximum amplitude value caused when walking) as a base.

As described above, in this embodiment, the size of an area for which a projection conversion process is to be performed is change depending on vibration, so that it is possible to reduce calculation burden by electronic vibration proof accompanied by a projection conversion process. Furthermore, when picture shift or positional change due to vibration does not exist, a perspectively projected image is outputted by means of projection conversion which causes little image deterioration, and even when picture shift or positional change due to vibration exists, image deterioration due to scaling is suppressed as much as possible. Thereby, it is possible to realize an electronic vibration-proof function which causes little image deterioration.

Embodiment 2

In the embodiment 1, description has been made on the case where the image shift correction process is performed by means of hardware. However, it is also possible to perform the image shift correction process similar to that of the embodiment 1 by a computer program (an image processing program) stored in the CPU 113.

Figure 11:
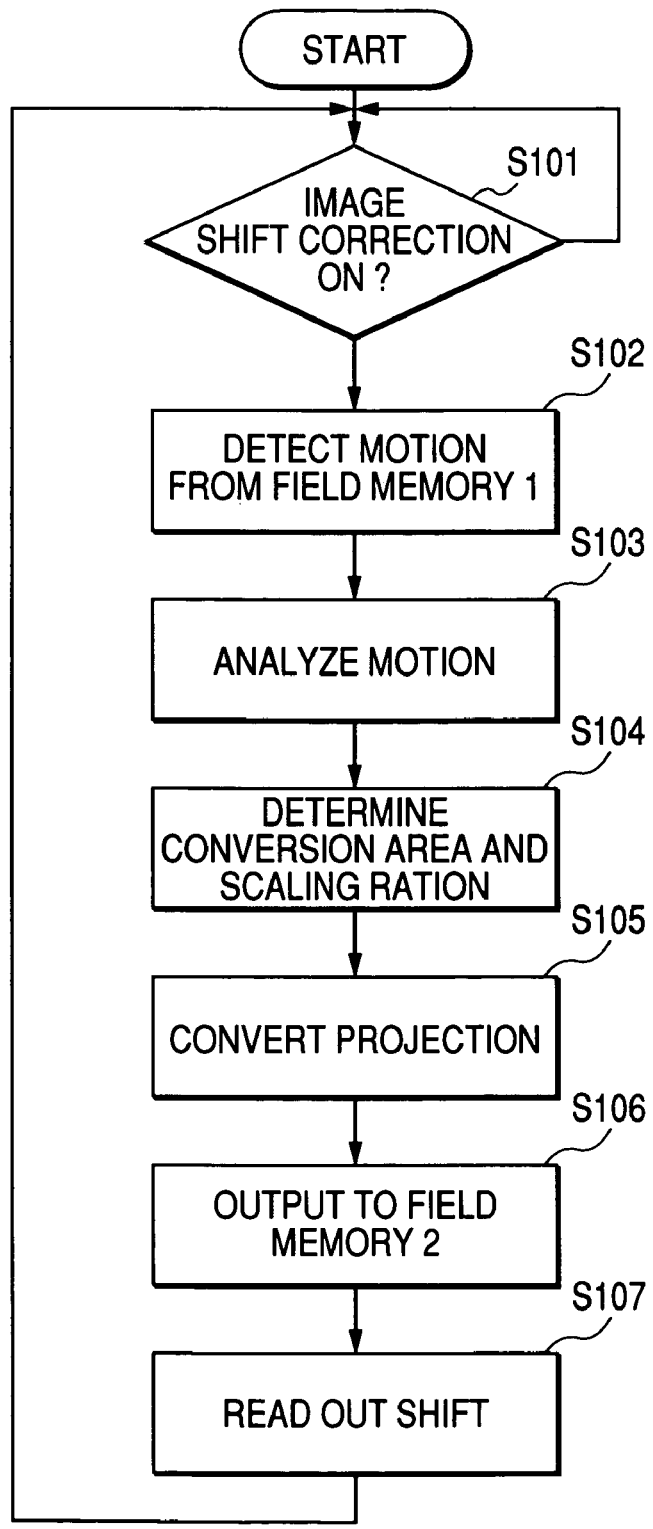
FIG. 11 shows a flowchart showing an image processing program for an image taking apparatus, which is an embodiment 2 of the present invention.

FIG. 11 shows a flowchart of the image shift correction processing program. First, the CPU 113 determines whether or not the image shift correction operation has been selected by a user (for example, whether or not it has been selected by a switching operation), at step (indicated by S in the figure) 101. If the image shift correction operation has been selected, then the process proceeds to step 102, and otherwise step 101 is repeated. The step 101 may be a step of determining whether or not an instruction to perform the image shift correction operation has been issued or not in the program (software) even if the image shift correction operation has not been selected at the image taking apparatus. It is also possible to cause image shift correction to be automatically performed and skip step 101 if the processing is performed by the program. Furthermore, it is also possible to determine whether or not image shift (image shift due to shaking or the like caused when a picture is taken by the image taking apparatus) exists in an input image and cause the correction operation to be performed only when there is any image shift. In this case, as for whether there is any image shift, it is possible to determine whether or not there is caused any such image shift that gives uncomfortable feeling to an observer by determining whether or not the magnitude of the image shift (or any other substitutable value) exceeds a predetermined threshold.

At step 102, motion vectors of multiple areas in fisheye image data of continuous two fields stored and retained in the first field memory 107 are determined as done by the motion detection circuit 111 described in the embodiment 1. Then, at step 103, the detected motion vectors of the multiple areas are integrated to generate vibration information indicating motion characteristics of the image taking apparatus.

Then, at step 104, the size of the conversion area in the fisheye image data, which is to be converted to a perspectively projected image, and the reduction or magnification ratio of the perspectively projected image are determined on the maximum amplitude value of vibration. The method for determining the size of the conversion area and the reduction or magnification ratio of the perspectively projected image is the same as that in the embodiment 1.

Then, at step 105, projection conversion is performed from the fisheye image data in the conversion area for which the size has been determined to a perspectively projected image, and a reduction process is performed with the determined reduction ratio. At step 106, an interpolation process (a magnification process) is performed for the image for which projection conversion has been performed, and the image is outputted to the second field memory 108. Furthermore, at step 107, a read-out area in the perspectively projected image within the second field memory 108 is shifted according to the amplitude of vibration. In this way, picture image shift correction has been performed.

Embodiment 3

In this embodiment, description will be made on an image shift correction process in the case where an image taking apparatus is provided with an electronic zoom function.

Figure 12:
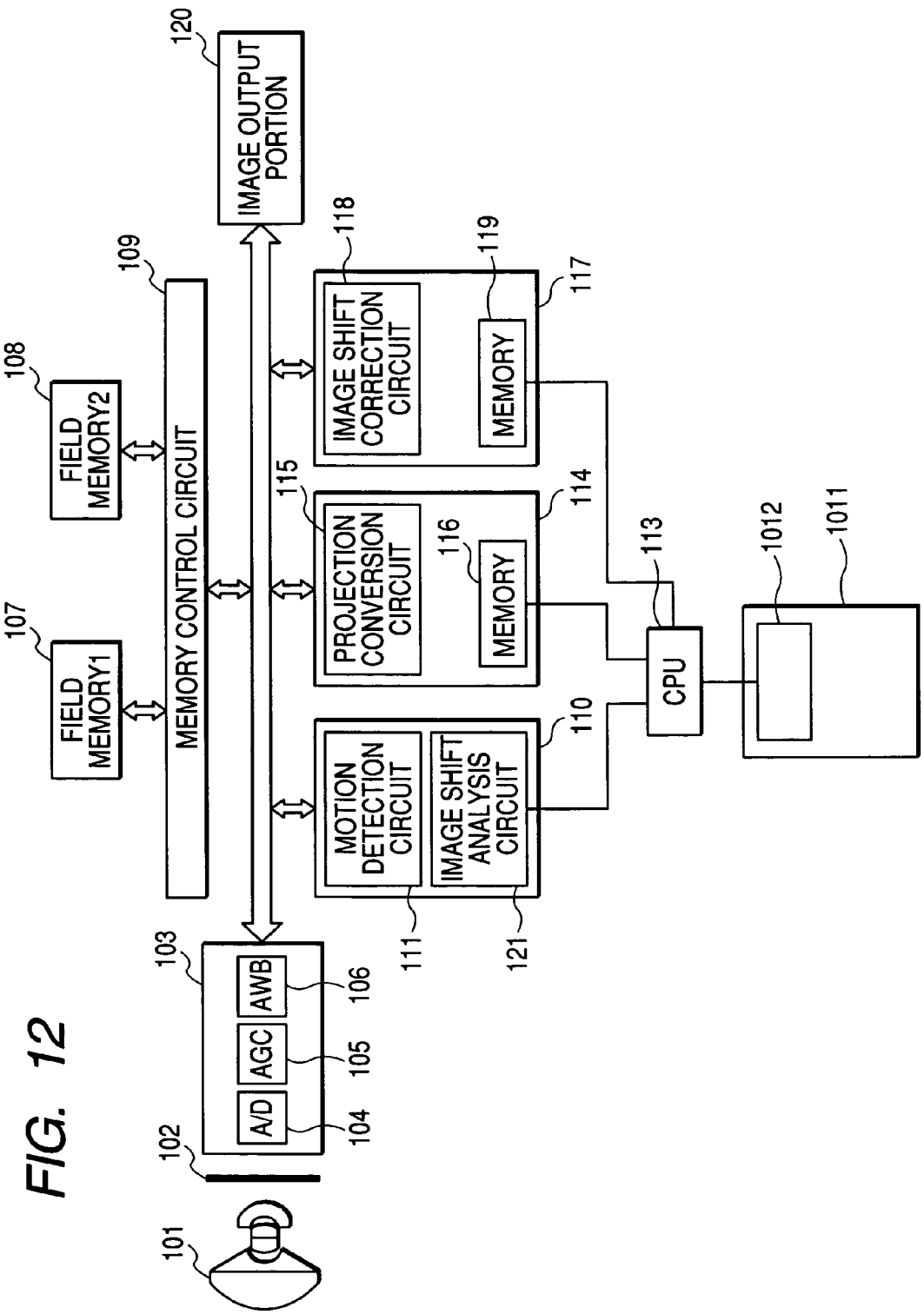
FIG. 12 is a block diagram showing the configuration of an image taking apparatus which is an embodiment 3 of the present invention.

FIG. 12 shows the configuration of an image taking apparatus according to this embodiment, and the elements common to the embodiment 1 (FIG. 1) are denoted by the same reference numerals of FIG. 1.

Reference numeral 1011 denotes an operation section for a user to operate various functions of the image taking apparatus, and reference numeral 1012 denotes a zoom operation section provided in the operation section 1011 for performing a zoom operation for a taken image.

Description will be now made below on the image taking operation, including the zoom operation and image shift correction which accompanies zooming, in the image taking apparatus.

Figure 13A:
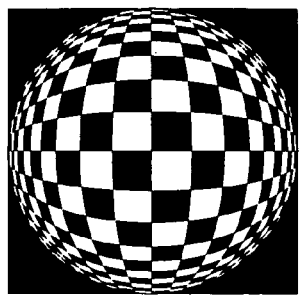
FIG. 13A shows an object in a grid pattern.

The image taking apparatus employs an electronic zoom method in which scaling of a taken image is electronically performed. Therefore, a fisheye image formed on the image taking element 102 by the fisheye optical system 101 and fisheye image data stored in the first field memory 107 are not changed by a zoom operation. That is, when an image of an object in a grid pattern as shown in FIG. 13A (the same object in a grid pattern shown in FIG. 7 in the embodiment 1) is taken, a fisheye image formed on the image taking element 102 and an image developed in the memory space of the first field memory 107 are not changed by a zoom operation.

Figure 13B:
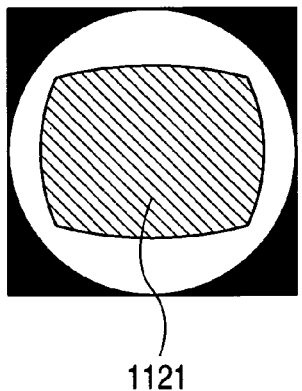
FIGS. 13B and 13D show a projection conversion area determined depending on the zoom ratio.
Figure 13D:
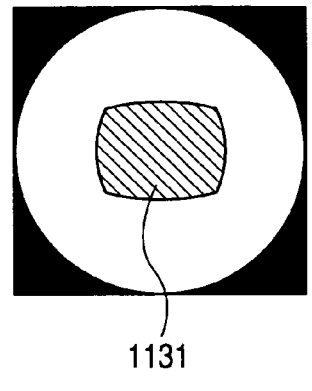
Figure 13C:
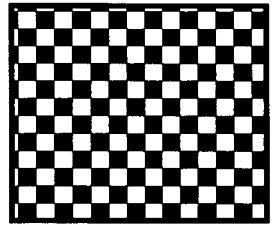
FIGS. 13C and 13F, illustrate an image to be developed in a field memory according to the zoom ratio.

FIG. 13B shows a conversion area 1121 for which projection conversion is to be made, in the fisheye image in the first field memory 107 before a zoom operation is performed (with an initial zoom ratio), and FIG. 13C shows a perspectively projected image stored and retained in the second field memory 108 after the projection conversion is performed.

When a photographer operates the zoom operation section 1012 to change the initial zoom ratio, the changed zoom ratio is communicated to the projection conversion circuit 115. The projection conversion circuit 115 updates the conversion equation and a conversion table so that projection conversion from the fisheye image to a perspectively projected image can be performed with the changed zoom ratio.

The conversion equation equivalently indicating projection conversion is:

$$h = K \cdot \sin\{\arctan(f/H)\}$$

where H denotes the distance from the center of the optical axis in a perspectively projected image; f is a constant and denotes the focal distance in the perspectively projected image; and h denotes the distance from the center of the optical axis of an orthographically projected fisheye image.

By changing the constant K in the above equation according to the zoom ratio, a magnified or reduced perspectively projected image can be obtained from the perspectively projected image for which an initial zoom ratio is set.

However, the projection conversion circuit 115 is not limited to a projection conversion circuit for performing distortion correction by calculation using the above-described conversion equation. The projection conversion circuit 115 may perform distortion correction by conversion of a lookup table created from the above conversion equation.

Figure 13E:
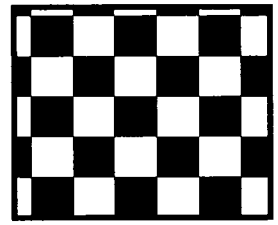

FIG. 13D shows a conversion area for which projection conversion is to be performed for the fisheye image in the first field memory 107 after an zoom operation for magnification is performed. FIG. 13E shows a perspectively projected image stored and retained in the second field memory 108 after the projection conversion is performed. Since the visual area for the object is reduced by the zoom operation for magnification, a conversion area 1131 in the first field memory 107 after the zoom operation is smaller than the conversion area 1121 before the zoom operation, as seen from comparison of FIG. 13B and FIG. 13D. The operation described above is the operation performed when a zoom operation is performed.

Description will be now made on an image taking operation including image shift correction performed when zooming is performed. As the zoom ratio is higher, the amount of picture shift or positional change increases. Therefore, it is required to secure a broader picture margin area for image shift correction as the zoom ratio is higher.

Figure 14A:
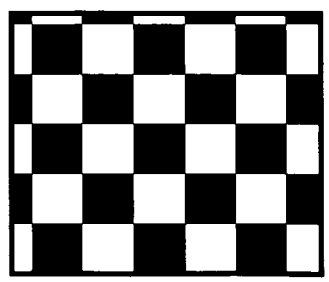
FIG. 14A shows a field memory space when image shift correction is not performed.
Figure 14B:
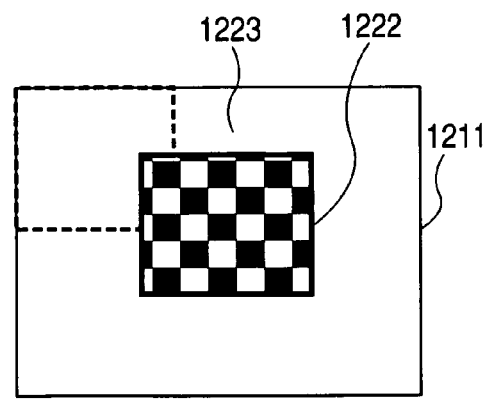
FIG. 14B shows a field memory space when image shift correction is performed.

FIGS. 14A and 14B show the memory space of the second field memory 108. FIG. 14A shows a projected image which has been zoomed in the memory space when image shift correction is not performed. FIG. 14B shows a projected image which has been zoomed in the memory space when image shift correction is performed.

As shown in FIG. 14B, when image shift correction is performed, the projection conversion process and the reduction process are performed at the same time to secure a margin for correction in the memory space. In this case, the amount of image shift increases as the zoom ratio is higher even if the amplitude of vibration given to the image taking apparatus body is the same, and accordingly, the margin for correction must be larger as the zoom ratio is higher. Accordingly, by detecting the maximum amplitude amount of the image taking apparatus body by the shaking analysis circuit 112 and by using a lookup table not shown, for (example, the amount of margin appropriate for the maximum amplitude amount and the zoom ratio is determined. Furthermore, the zoom ratio to be set to secure the amount of margin is determined as the projection conversion zoom ratio used when image shift correction is performed.

When the zoom ratio specified by an operation of the zoom operation section 1012 (a specified zoom ratio) is denoted by n, and the maximum vibration amplitude amount acquired at the shaking analysis circuit 121 is denoted by x, the projection conversion circuit 115 calculates the projection conversion zoom ratio m (m≦n), for example, from m=n/(x) (where p is a constant), using the specified zoom ratio n and the maximum amplitude amount x. The larger the maximum amplitude amount x is, the larger the projection conversion zoom ratio m is. (Comment: It is assumed that, even when the zoom ratio is large, m=n if the amount of shift or positional change is 0, and that m decreases in proportion to the amount of shift or positional change.)

In FIG. 14B, reference numeral 1222 denotes a perspectively projected image obtained by performing projection conversion for a fisheye image at the calculated projection conversion zoom ratio m, and a margin for correction denoted by reference numeral 1223 has been formed in a memory space 1211. This margin portion is used as a readable area when image shift correction is performed. The processes other than the above zoom process and image shift correction process are similar to the processes of the embodiment 1.

According to this embodiment, in addition to the operation and the effect of the embodiment 1, it is possible to reduce image quality deterioration in electronic zoom accompanied by an electronic vibration-proof function.

In this embodiment, description has been made on the case where the image shift correction process is performed by means of hardware. However, it is also possible to perform the image shift correction process by a computer program (a image shift correction processing program) stored in the CPU 113, similarly to the embodiment 2.

In each of the above embodiments, description has been made on an image taking apparatus provided with an optical system using a single fisheye lens on the side of an object. However, the present invention may be an image taking apparatus provided with an optical system in which a so-called compound-eye lens array consisting of multiple lens elements is arranged on the side of an object to form a fisheye image.

In each of the above embodiments, description has been made on the case where information about vibration given to an image taking apparatus is obtained with the use of fisheye image data. However, the information about vibration may be obtained with the use of a sensor such as a vibration gyroscope.

Furthermore, any combination of the above embodiments may be used unless any discrepancy is caused. Furthermore, though each embodiment shows a case where a fisheye image (an image taken with the use of a fisheye optical system or an image which appears as if it had been taken with the use of a fisheye optical system) is converted to a perspectively projected image, this is not limiting. Specifically, it is possible that a fisheye image which has been taken (or which appears as if it had been taken) in a projection method is converted to a fisheye image which appears as if it had been taken in a different projection method. Alternatively, it is also possible to convert a perspectively projected image to a fisheye image. That is, if the embodiment is applied to a process for converting an image which has been taken (or which appears as if it had been taken) in a projection method (including a perspective projection method) to an image which appears as if it had been taken in a different projection method, the same effect of the embodiment can be obtained, and it is possible to acquire a comfortable image without shift or positional change even when the position at which an image should be projected has been displaced (when displacement of pixels has occurred) due to vibration such as shaking or other factors.

Furthermore, the present invention is applicable not only to an image taking apparatus which is integrally provided with an optical system for forming a fisheye image but also to an image taking apparatus for which its optical system is exchangeable.

In the embodiments, description has been made mainly on an image taking apparatus. However, the embodiments are applicable to a program for performing the processes as described in the embodiments, an image processing apparatus equipped with the program and, of course, an image taking apparatus or an image taking system equipped with the program and outputting a processed image.

According to the embodiments described above, the size of an area for which a projection conversion is to be performed is changed depending on vibration given to an image taking apparatus body, so that it is possible to reduce calculation burden by electronic vibration proof in an image taking apparatus for taking a fisheye image and outputting a perspectively projected image.

If the size of a conversion area is changed based on vibration information and information about the zoom ratio when the electronic vibration-proof function and the electronic zoom function are used in combination with each other, it is possible to reduce calculation burden imposed wheel electronic zoom accompanied by electronic vibration proof is used.

Furthermore, according to the embodiments, the reduction ratio for an image is changed depending on vibration given to an image taking apparatus body, so that it is possible to realize an electronic vibration-proof function causing little image quality deterioration in an image taking apparatus for taking a fisheye image and outputting a perspectively projected image.

If the reduction ratio for image data is changed based on vibration information and information about the zoom ratio when the electronic vibration-proof function and the electronic zoom function are used in combination with each other, it is possible to reduce image quality deterioration caused when electronic zoom accompanied by electronic vibration proof is used.

This application claims priority from Japanese Patent Application No. 2004-059846 filed Mar. 3, 2004, which is hereby incorporated by reference herein.

What is claimed is:

1. An image taking apparatus capable of taking a fisheye image in accordance with a first projection method, the image taking apparatus comprising:

an image taking element that photoelectrically converts the fisheye image;

a conversion processing section that converts a portion of an area of the fisheye image acquired with the image taking element to a converted image in accordance with a second projection method, which is different from the first projection method, to reduce fisheye distortion; and a vibration detection section that acquires information about vibration of the image taking apparatus, wherein the conversion processing section first selects the portion of the fisheye image independently of an amount of the vibration detected by the vibration detection section and then changes the size of the selected portion of the fisheye image based on the amount of the vibration detected by the vibration detection section to create the converted image, wherein the fisheye image has a larger image taking magnification ratio at a central area thereof than that at an edge area thereof, and wherein the converted image has a substantially equal image taking magnification ratio between the central area thereof and the edge area thereof.

2. The image taking apparatus according to claim 1, further comprising an image shift correction section that shifts an area in the converted image, which is to be output, based on the vibration information.

3. The image taking apparatus according to claim 1, wherein the conversion processing section reduces the size of the selected portion of the fisheye image as the vibration is larger.

4. The image taking apparatus according to claim 1, further comprising:

a zoom section that changes the zoom ratio of the fisheye image,
    wherein the conversion processing section changes the size of the conversion area based on the vibration information and information about the zoom ratio.

5. The image taking apparatus according to claim 4, wherein the conversion processing section reduces the selected portion of the fisheye image as the zoom ratio is larger.

6. A non-transitory computer-readable medium that stores an image processing program for causing a computer to perform an image processing method comprising:
    a first conversion step of converting a fisheye image in accordance with a first projection method;
    a second conversion step of converting an area of the fisheye image to a converted image in accordance with a second projection method, which is different from the first projection method; and
    a detection step of detecting information about image shift of the fisheye image on an image taking of the fisheye image,
    wherein the second conversion step first selects the portion of the fisheye image independently of the image shift information detected in the detection step and then changes the size of the selected portion of the fisheye image based on the image shift information detected in the detection step to create the converted image,
    wherein the fisheye image has a larger image taking magnification ratio at a central area thereof than that at an edge area thereof,
    wherein the converted image has a substantially equal image taking magnification ratio between the central area thereof and the edge area thereof.

7. The computer-readable medium according to claim 6, further comprising a image shift correction step of shifting an area of the converted image, which is to be output, based on the image shift information.

8. The computer-readable medium according to claim 6, wherein the conversion step reduces the size of the selected portion of the fisheye image as the image shift is larger.

9. The computer-readable medium according to claim 6, further comprising:
    a zoom setting step of changing the zoom ratio of the fisheye image,
    wherein the conversion step changes the size of the selected portion of the fisheye image based on the image shift information and the zoom ratio.

10. The computer-readable medium according to claim 9, wherein the conversion step reduces the selected portion of the fisheye image as the zoom ratio is larger.

11. An image taking apparatus capable of taking a fisheye image in accordance with a first projection method, the image taking apparatus comprising:
    an image taking element that photoelectrically converts the fisheye image;
    a conversion processing section that converts a portion of an area of the first image acquired with the image taking element to a converted image in accordance with a second projection method, which is different from the first projection method; and
    a vibration detection section that detects an amount of vibration imparted to the image taking element,
    wherein the conversion processing section first selects the portion of the fisheye image independently of the vibration detection information detected by the vibration detection section and then reduces the size of the selected portion of the fisheye image to the converted image at a reduction ratio corresponding to an amount of the vibration detected by the vibration detection section to create the converted image,
    wherein the fisheye image has a larger image taking magnification ratio at a central area thereof than that at an edge area thereof,
    wherein the converted image has a substantially equal image taking magnification ratio between the central area thereof an the edge area thereof.

12. The image taking apparatus according to claim 11, further comprising an image shift correction section that shifts an area of the selected portion of the fisheye image, which is to be output, based on the detected amount of vibration.

13. A non-transitory computer-readable medium that stores an image processing program for causing a computer to perform an image processing method comprising:
    a first conversion step of converting a fisheye image in accordance with a first projection method;
    a second conversion step of converting a portion of an area of the fisheye image to a converted image in accordance with a second projection method, which is different from the first projection method; and
    an image shift detection step of detecting an amount of image shift in the fisheye image,
    wherein the second conversion step first selects the portion of the fisheye image independently of the image shift amount detected by the image shift detecting step and then reduces the size of the selected portion of the fisheye image a reduction ratio corresponding to the image shift amount detected in the image shift detection step to create the converted image,
    wherein the fisheye image has a larger image taking magnification ratio at a central area thereof than that at an edge area thereof, and
    wherein the converted image has a substantially equal image taking magnification ratio between the central area thereof and the edge area thereof.

14. The non-transitory computer-readable medium according to claim 13, further comprising a image shift correction step of shifting an area in the selected portion of the fisheye image based on the detected amount of image shift.

* * * * *